(12) United States Patent
Yumiki et al.

(10) Patent No.: US 7,796,350 B2
(45) Date of Patent: Sep. 14, 2010

(54) INTERCHANGEABLE LENS BARREL, PROGRAM REWRITING SYSTEM FOR INTERCHANGEABLE LENS BARREL

(75) Inventors: Naoto Yumiki, Osaka (JP); Hiroshi Ueda, Osaka (JP); Makoto Azuma, Tokushima (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 68 days.

(21) Appl. No.: 12/093,066

(22) PCT Filed: Oct. 2, 2006

(86) PCT No.: PCT/JP2006/319727

§ 371 (c)(1),
(2), (4) Date: May 8, 2008

(87) PCT Pub. No.: WO2007/063640

PCT Pub. Date: Jun. 7, 2007

(65) Prior Publication Data

US 2009/0097138 A1  Apr. 16, 2009

(30) Foreign Application Priority Data

Dec. 2, 2005 (JP) ............................. 2005-349190

(51) Int. Cl.
*G02B 7/02* (2006.01)
*G03B 17/00* (2006.01)

(52) U.S. Cl. .......................... 359/808; 359/819; 396/55

(58) Field of Classification Search ................ 359/808, 359/694–700, 819–824; 396/55, 90, 300
See application file for complete search history.

(56) References Cited

U.S. PATENT DOCUMENTS

| 4,857,951 | A | * | 8/1989 | Nakajima et al. ............. 396/90 |
| 4,916,474 | A | * | 4/1990 | Miyazawa et al. .......... 396/280 |
| 5,623,326 | A | | 4/1997 | Okano |
| 5,752,089 | A | * | 5/1998 | Miyazawa et al. ............ 396/48 |
| 6,122,447 | A | | 9/2000 | Washisu |
| 6,219,494 | B1 | | 4/2001 | Watanabe |
| 7,142,780 | B2 | * | 11/2006 | Katagishi ..................... 396/54 |

FOREIGN PATENT DOCUMENTS

| JP | 6-16946 | 3/1994 |
| JP | 6-332691 | 12/1994 |
| JP | 7-225687 | 8/1995 |
| JP | 8-262518 | 10/1996 |

(Continued)

*Primary Examiner*—Mohammed Hasan
(74) *Attorney, Agent, or Firm*—McDermott Will & Emery LLP

(57) ABSTRACT

An interchangeable lens barrel and a program rewriting system, in which a program included in the interchangeable lens barrel is easily changeable, are provided. An interchangeable lens barrel 2 is detachable from a camera body 1, and includes a storage section 36 for storing a first program concerning a function of the interchangeable lens barrel 2, a connection section 38 for connecting to an external input/output device 60, a reception section 32 for receiving a second program concerning the function of the interchangeable lens barrel from the input/output device 60 through the connection section 38, and a rewriting section 37 for replacing the stored first program with the received second program.

7 Claims, 6 Drawing Sheets

FOREIGN PATENT DOCUMENTS

| | | |
|---|---|---|
| JP | 2000-98467 | 4/2000 |
| JP | 2000-111994 | 4/2000 |
| JP | 2005-78343 | 3/2005 |
| JP | 2005-128334 | 5/2005 |
| JP | 2005-258202 | 9/2005 |
| JP | 2005-316187 | 11/2005 |
| JP | 2006-113432 | 4/2006 |

* cited by examiner

INTERCHANGEABLE LENS BARREL, PROGRAM REWRITING SYSTEM FOR INTERCHANGEABLE LENS BARREL

RELATED APPLICATIONS

This application is the U.S. National Phase under 35 U.S.C. §371 of International Application No. PCT/JP2006/319727, filed on Oct. 2, 2006, which in turn claims the benefit of Japanese Patent Application No. JP 2005-349190, filed on Dec. 2, 2005, the disclosures of which Applications are incorporated by reference herein.

TECHNICAL FIELD

The present invention relates to an interchangeable lens barrel which is detachable from a camera body, and more particularly, to an interchangeable lens barrel having a microcomputer, in which a program of the microcomputer is rewritable, and a program rewriting system including the interchangeable lens barrel.

BACKGROUND ART

Recently, there have been rapidly popularized imaging devices (hereinafter, referred to merely as digital cameras), such as a digital still camera, a digital camcorder, and the like, which are capable of converting an optical image of an object into an image signal and outputting the image signal. As such digital cameras, there have been proposed many single-lens reflex camera systems (hereinafter, referred to merely as single-lens reflex cameras), each including mainly a camera body and an interchangeable lens barrel which is detachable from the camera body.

Further, in accordance with enhancement of functions of the digital camera, a microcomputer is incorporated in the interchangeable lens barrel for the single-lens reflex camera. The microcomputer operates in accordance with a program and data which are written in a ROM. For example, the microcomputer transmits data, which is specific to a lens, to the digital camera body, and controls a motor for driving the lens. The program and the data allow the single-lens reflex camera to operate optimally when a digital camera body and an interchangeable lens are combined in a manner as assumed when a camera system is designed.

However, nowadays, while a product cycle of the digital camera body has been shortened, basic performance of a lens, such as optical performance, and the like, is unlikely to become obsolete. Generally, a product cycle of the interchangeable lens barrel is longer than that of the digital camera body. Thus, there is a desire for an interchangeable lens barrel which is capable of being combined with various digital camera bodies and being used over long periods of time. However, there is a problem that unless a program and data in the interchangeable lens barrel are updated, the interchangeable lens barrel cannot be used in combination with a digital camera body having a new function, which is not assumed when a camera system is designed.

In Japanese Laid-Open Patent Publication No. 6-332691 (hereinafter, referred to as Patent Document 1), there is proposed a system incorporating therein a one-chip microcomputer realized by a microcomputer having a flash-memory. In the system disclosed in the Patent Document 1, an update program for a camera body and an interchangeable lens barrel is transmitted from a program transmitting device to the camera body. As a result, programs existing in the camera body and the interchangeable lens barrel, which is connected to the camera body through a lens mount, are replaced with the update program. As described above, in the Patent Document 1, the connection of the digital camera body to the interchangeable lens barrel allows update of the program in the interchangeable lens barrel.

Meanwhile, for enhancing the convenience of the user, there have been proposed a standard of the single-lens reflex camera system, in which a communication system between the digital camera body and the interchangeable lens barrel, a lens mount, and the like are standardized. Thus, a digital camera body and an interchangeable lens barrel, which comply with the standard, are compatible with each other, and the user can use in combination a camera body and an interchangeable lens barrel, which are manufactured by different manufacturers, for performing photographing.

[Patent Document 1] Japanese Laid-Open Patent Publication No. 6-332691

DISCLOSURE OF THE INVENTION

Problems to be Solved by the Invention

According to the system disclosed in the Patent Document 1, however, the interchangeable lens barrel needs to be connected to the digital camera body for updating the program in the interchangeable lens barrel. Thus, the system disclosed in the Patent Document 1 has a problem that the program in the interchangeable lens barrel cannot be replaced only by using the program transmitting device and the interchangeable lens barrel. In addition, the system has a problem that the program in the interchangeable lens barrel cannot be always updated by performing transmission and reception of an update program between a camera body and an interchangeable lens barrel, which are manufactured by different manufacturers.

Therefore, an object of the present invention is to provide an interchangeable lens barrel and a program rewriting system, in which a program included in the interchangeable lens barrel is easily changeable.

Solution to the Problems

The object of the present invention is achieved by an interchangeable lens barrel having the following configuration. The interchangeable lens barrel is detachable from a camera body, and comprises: a storage section for storing a first program concerning a function of the interchangeable lens barrel; a connection section for connecting to an external input/output device; a reception section for receiving a second program concerning the function of the interchangeable lens barrel from the input/output device through the connection section; and a rewriting section for replacing the stored first program with the received second program.

By this configuration, a program existing in the interchangeable lens barrel can be replaced with the update program transmitted from the external input/output device which is connected to the interchangeable lens barrel. Thus, the program in the interchangeable lens barrel can be updated without using the camera body, and hence a convenient interchangeable lens barrel can be provided.

The object of the present invention is achieved by a program rewriting system having the following configuration. The program rewriting system comprises: an interchangeable lens barrel which is detachable from a camera body; and an input/output device which is connectable to the interchangeable lens barrel. The interchangeable lens barrel includes: a first storage section for storing a first program concerning a function of the interchangeable lens barrel; a connection section for connecting to the input/output device; a reception section for receiving a second program concerning the function of the interchangeable lens barrel from the input/output device through the connection section; and a rewriting section for replacing the stored first program with the received second program. The input/output device includes: a second storage section for storing the second program; and an output section for outputting the stored second program to the interchangeable lens barrel.

EFFECT OF THE INVENTION

As described above, the present invention can provide an interchangeable lens barrel and a program rewriting system, in which a program included in the interchangeable lens barrel is easily changeable.

Figure 1:
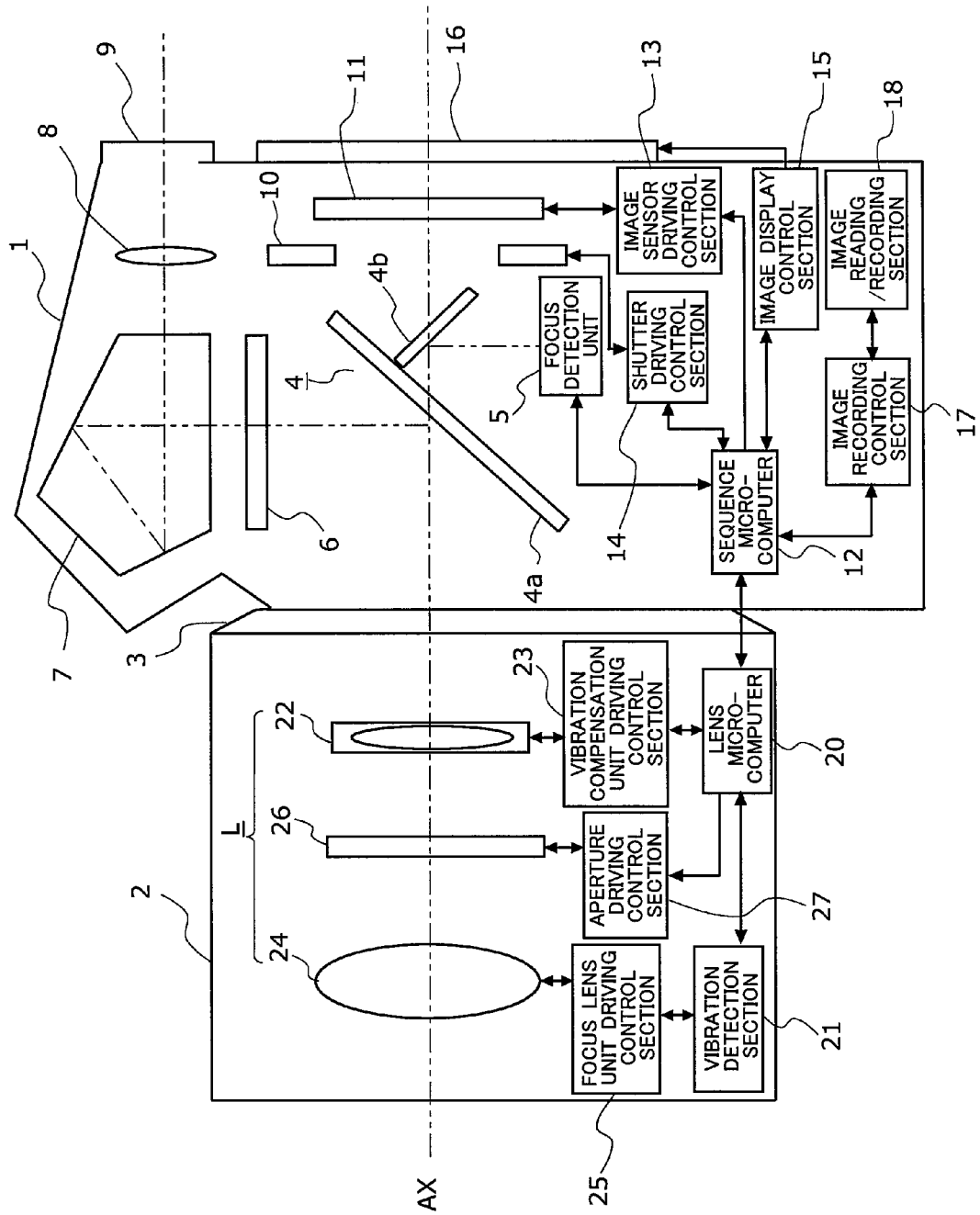
FIG. 1 is a view showing a configuration of a single-lens reflex camera according to an embodiment.

DESCRIPTION OF THE REFERENCE CHARACTERS 1 digital camera body
2 interchangeable lens barrel
3 lens mount
4 quick turn mirror
5 focus detection unit
6 finder screen
7 pentaprism
8 eyepiece
9 finder eyepiece window
10 shutter unit
11 image sensor
12 sequence microcomputer
13 image sensor driving control section
14 shutter driving control section
15 image display control section
16 image display section
17 image recording control section
18 image reading/recording section
20 lens microcomputer
21 vibration detection unit
22 vibration compensation lens unit
23 vibration compensation unit driving control section
24 focus lens unit
25 focus lens unit driving control section
26 aperture unit
27 aperture driving control section
31 operation switch
32 external data input section
33 serial I/O section
34 CPU
35 RAM
36 flash ROM
37 writing controller
38 I/O SECTION
39 internal bus
40 zoom ring
41 focus ring
42 screw
50 circuit substrate
51 flexible print cable
60 external data transmitting device
61 connecting cable

BEST MODE FOR CARRYING OUT THE INVENTION

Embodiment 1

The following will describe an embodiment of the present invention. FIG. 1 is a view showing a configuration of a single-lens reflex camera according to the embodiment 1. As shown in FIG. 1, the single-lens reflex camera includes a digital camera body 1 and an interchangeable lens barrel 2. The interchangeable lens barrel 2 according to the present embodiment is detachable from the digital camera body 1.

The digital camera body 1 mainly includes a quick turn mirror 4, a focus detection unit 5, a finder optical system, a shutter unit 10, an image sensor 11, a sequence microcomputer 12, an image sensor driving control section 13, a shutter driving control section 14, an image display control section 15, an image display section 16, an image recording control section 17, and an image reading/recording section 18.

The quick turn mirror 4 is a half mirror which reflects a part of an incident light and allows the rest of the incident light to pass therethrough. The quick turn mirror 4 is rotatable about an axis between a position in a normal state and a position in an exposure state. In the normal state (during a period when no picture is taken) as shown in FIG. 1, the quick turn mirror 4 is disposed on a light path for photographing, and the shutter unit 10 is in a closed state. An object light which is incident on the quick turn mirror 4 is divided into two beams by a main mirror 4a. One of the two beams is incident on the finder optical system, and the other of the two beams is reflected toward the focus detection unit 5 by a sub-mirror 4b after being incident on the sub-mirror 4b.

On the other hand, in the exposure state (during a period when a picture is taken) which is not shown in the drawings, the quick turn mirror 4 is rotated out of the light path for photographing. The object light which has passed through an imaging optical system L in the exposure state is incident on the image sensor 11 and forms an optical image of an object on the image sensor 11 when the shutter unit 10 is in an open state.

The finder optical system includes a finder screen 6, a pentaprism 7, an eyepiece 8, and a finder eyepiece window 9. The beam reflected by the main mirror 4a of the quick turn mirror 4 forms an image on the finder screen 6. A user can confirm an optical image of the object by observing it through the finder eyepiece window 9.

The focus detection unit 5 is a focus detection device which receives a light reflected by the sub-mirror 4b to detect a focused state of the image of the object. In the present embodiment, a phase difference detection method is used as a method of detecting a focused position, and the focused position is detected from a defocus amount, which is obtained by forming images from different pupils, respectively.

The image sensor 11 is a CCD (Charge Coupled Device), and converts an optical image formed by the imaging optical system L into an electric signal. The image sensor 11 is controlled to be driven by the image sensor driving control section 13, which is connected to the image sensor 11, so as to receive the optical image of the object as a light intensity signal in accordance with a light intensity. It is noted that the image sensor 11 may be a CMOS (Complementary Metal-Oxide Semiconductor).

The shutter unit 10 is disposed immediately before the image sensor 11 on a side of the object, and adjusts an amount of light taken into the image sensor 11. The shutter unit 10 is controlled by the shutter driving control section 14 so that appropriate exposure is performed.

The image display control section 15 is provided on the back surface of the digital camera body 1, and performs predetermined image processing on an image signal outputted from the image sensor 11, thereby causing a photographed image to be displayed on the image display section 16, which is, for example, a liquid crystal display monitor. The image display section 16 displays thereon, as a visible image, an image signal on which the predetermined processing has been performed by the image display control section 15, or an image signal which is stored in the image reading/recording section 18. The image recording control section 17 performs predetermined image processing on the image signal outputted from the image sensor 11, and records a resultant signal in the image reading/recording section 18, which is, for example, a record medium such as a memory card, and the like.

The sequence microcomputer 12 controls various sequences included in the digital camera body 1 and the interchangeable lens barrel 2. The sequence microcomputer 12 is capable of transmitting a signal to or receiving a signal from the focus detection unit 5, the shutter driving control section 14, the image sensor driving control section 13, the image display control section 15, the image recording control section 17, and a lens microcomputer 20 which is connected to the sequence microcomputer 12 through the lens mount 3.

The following will describe a configuration of the interchangeable lens barrel 2 which is detachable from the digital camera body 1. The interchangeable lens barrel 2 mainly includes the imaging optical system L, the lens mount 3, the lens microcomputer 20, a vibration detection unit 21, a vibration compensation unit driving control section 23, a focus lens unit driving control section 25, a aperture unit 26, an operation switch 31, and an external data input section 32.

The imaging optical system L forms the optical image of the object on the image sensor 11. As shown in FIG. 1, the imaging optical system L includes a vibration compensation lens unit 22 and a focus lens unit 24. The focus lens unit 24 is controlled by the focus lens unit driving control section 25, and focusing is performed by moving the focus lens unit 24 in an optical axis direction.

The vibration detection unit 21 detects an amount of vibration of the digital camera, and is, for example, an angular velocity sensor. The vibration compensation unit driving control section 23 moves the vibration compensation lens unit 22 in a direction perpendicular to an optical axis AX based on the detected amount of vibration for preventing an image quality of a photographed image from deteriorating.

The lens microcomputer 20 controls various sequences of the interchangeable lens barrel 2. The lens microcomputer 20 is capable of transmitting a signal to or receiving a signal from the vibration detection unit 21, the vibration compensation unit driving control section 23, the focus lens unit driving control section 25, a aperture driving control section 27, and the sequence microcomputer 12 which is connected to the lens microcomputer 20 through the lens mount 3 which is detachable from the camera body 1.

Figure 2:
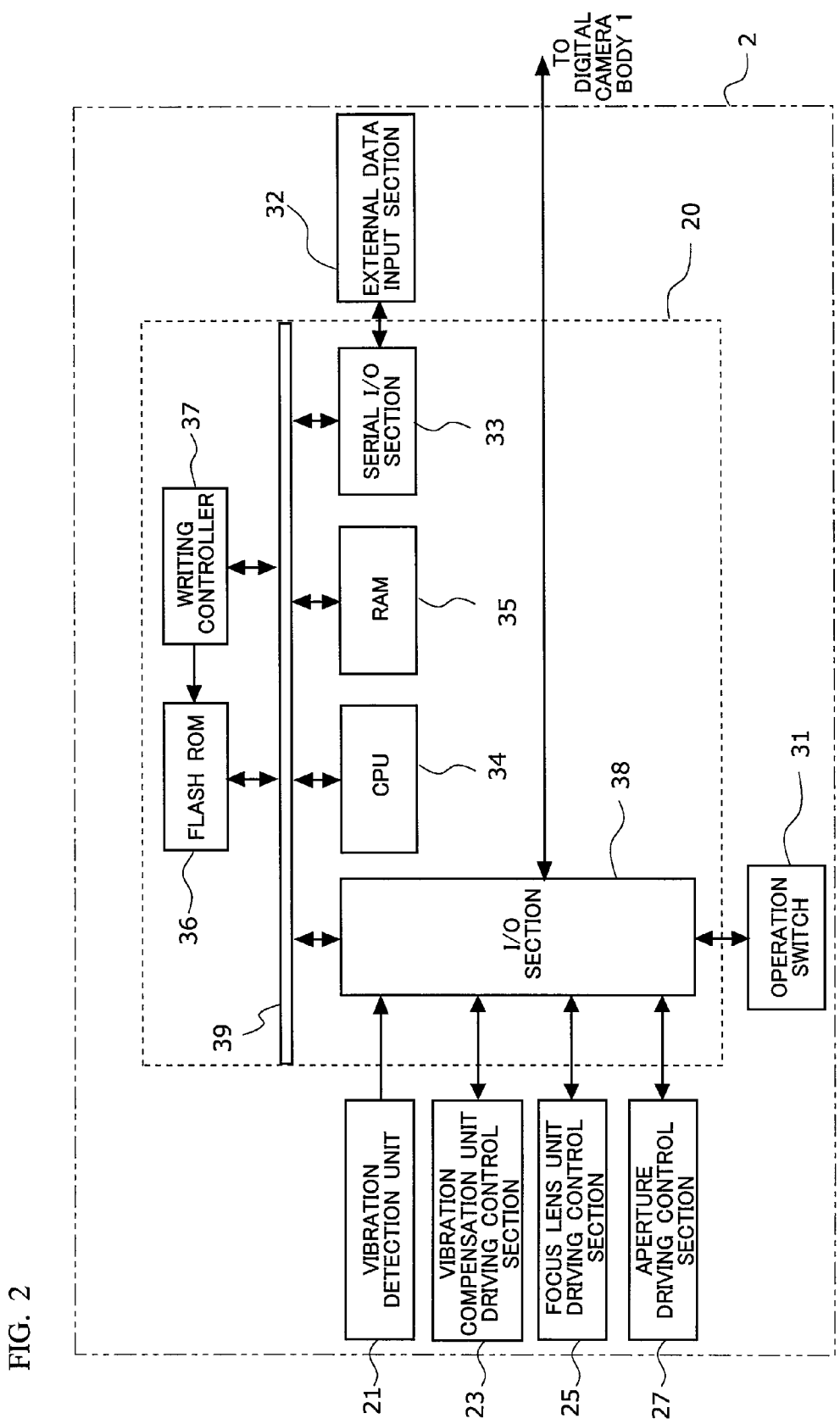
FIG. 2 is a block diagram showing a control system of an interchangeable lens barrel according to the embodiment.

The following will describe in detail the lens microcomputer 20 with reference to FIG. 2. FIG. 2 is a block diagram showing a control system of the interchangeable lens barrel 2 according to the present embodiment. The lens microcomputer 20 includes a serial I/O section 33, a CPU 34, a RAM 35, a flash ROM 36, a writing controller 37, and an I/O section 38, and these components are connected to each other through an internal bus 39. The vibration detection unit 21, the vibration compensation unit driving control section 23, the focus lens unit driving control section 25, the aperture driving control section 27, the operation switch 31, and the sequence microcomputer 12 of the digital camera body 1 are capable of performing communication with the lens microcomputer 20 through the I/O section 38.

The operation switch 31 is an operation member, which has an ON side and an OFF side and is capable of being switched between the ON side and the OFF side by the user. When the user switches the operation switch 31 to the ON side, a photographing mode is switched to a vibration compensation mode. The vibration compensation unit driving control section 23 drives the vibration compensation lens unit 22 in accordance with an output of the vibration detection unit 21 for preventing the image quality from deteriorating due to image blurring. On the other hand, when the user switches the operation switch 31 to the OFF side, the vibration compensation mode is cancelled, and the vibration compensation unit driving control section 23 fixes the vibration compensation lens unit 22 at an optical center and stops a vibration compensation operation.

The serial I/O section 33 performs serial communication with the sequence microcomputer 12 of the digital camera body 1, which is connected to the serial I/O section 33 through the I/O section 38, for transmitting and receiving various data therebetween. The serial I/O section 33 is connected to the external data input section 32, which connects the interchangeable lens barrel 2 to an external data transmitting device 60 and is, for example, a USB (Universal Serial Bus) terminal. The external data input section 32 is integral with the operation switch 31, and mounted on an outer surface of the interchangeable lens barrel 2.

The CPU 34 controls the serial I/O section 33, the RAM 35, the flash ROM 36, the writing controller 37, and the I/O section 38, which are connected to the CPU 34 through the internal bus 39. The flash ROM 36 stores a predetermined program or data concerning a function of the interchangeable lens barrel 2, and is, for example, a nonvolatile memory. For example, the program is a program for controlling operation of the interchangeable lens barrel 2. The data is, for example, data indicating a relation among a focal length, a distance to the object, and a movement amount of the focus lens unit 24, or data concerning a shift amount of the vibration compensation lens unit 22 from the optical center in accordance with the focal length, and the like.

The RAM 35 temporarily stores an update program transmitted from the external data transmitting device 60, which is connected to the RAM 35 through the external data input section 32. The writing controller 37 is a writing circuit for replacing a program stored in the flash ROM 36 with the update program stored in the RAM 35 in accordance with a control instruction from the CPU 34.

Figure 3:
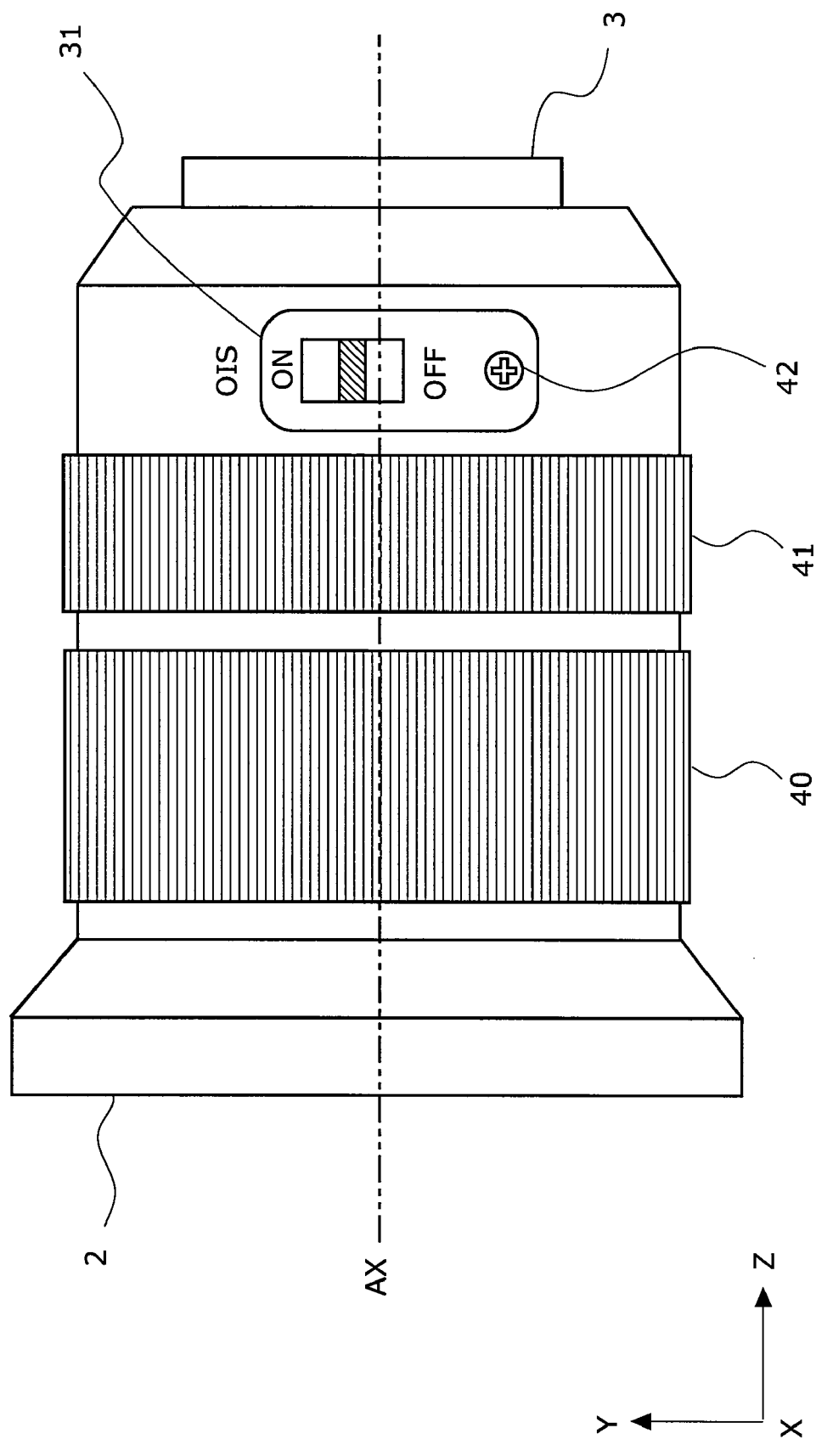
FIG. 3 is a view showing an external configuration of the interchangeable lens barrel according to the embodiment.

FIG. 3 is a view showing an external configuration of the interchangeable lens barrel 2. As shown in FIG. 3, the interchangeable lens barrel 2 includes, on the outer surface thereof, the operation switch 31 which is fixed by a screw 42, and a zoom ring 40 and a focus ring 41 which are coaxial with the optical axis AX of the imaging optical system L. The operation switch 31 is separable from the interchangeable lens barrel 2 by unscrewing the screw 42.

Figure 4:
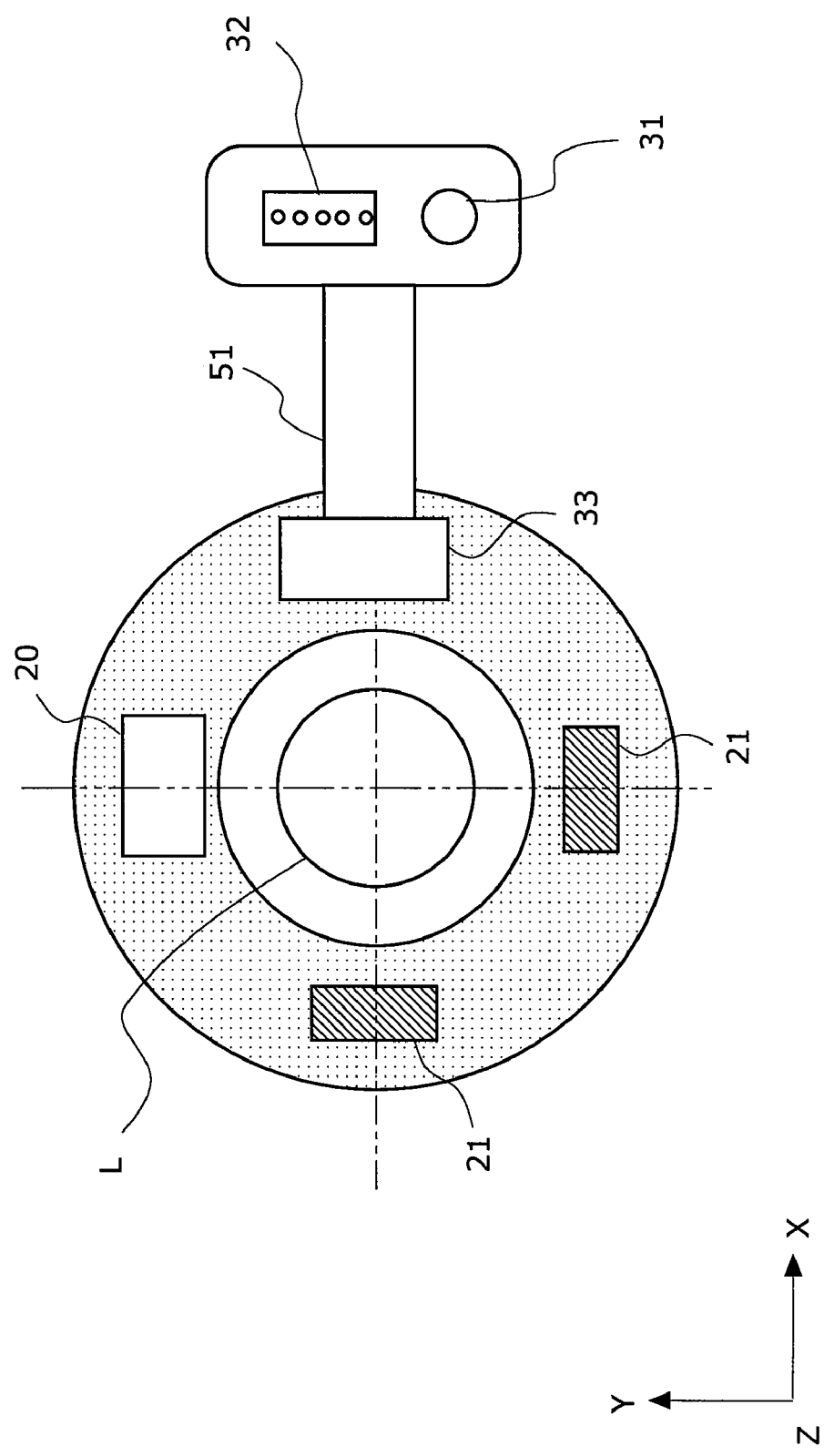
FIG. 4 is a schematic cross-sectional view showing a relation between a circuit substrate and an operation switch of the interchangeable lens barrel according to the embodiment.

FIG. 4 is a schematic cross-sectional view showing a relation between a circuit substrate and the operation switch 31 of the interchangeable lens barrel 2. As shown in FIG. 4, a circuit substrate 50 has a ring shape and is coaxial with the optical axis of the imaging optical system L. The lens microcomputer 20, the vibration detection unit 21, and the serial I/O section 33 are mounted on the circuit substrate 50. As described above, the external data input section 32 is integral with the operation switch 31, and provided on the back surface of the operation switch 31. The external data input section 32 is connected to the serial I/O section 33 through a flexible print cable 51. Since the external data input section 32 is mounted on the back surface of the operation switch 31, a terminal of the external data input section 32 is not exposed to the outside. Thus, the external data input section 32 is prevented from being damaged and has sufficient reliability while a design of the interchangeable lens barrel 2 does not deteriorate.

The following will describe a photographing sequence by the single-lens reflex camera thus constructed above. The photographing sequence is performed in accordance with predetermined programs stored in the flash ROMs of the sequence microcomputer 12 and the lens microcomputer 20. First, when the user presses a release button (not shown) halfway, power is supplied to the sequence microcomputer 12, the lens microcomputer 20, and other units. The power-supplied sequence microcomputer 12 receives various lens data from the lens microcomputer 20 through electric contacts of the I/O section 38 of the lens mount 3. The received various lens data are stored in a memory (not shown) in the sequence microcomputer 12.

The sequence microcomputer 12 obtains a defocus amount (hereinafter, referred to as a Df amount) from the focus detection unit 5. Subsequently, the sequence microcomputer 12 controls the focus lens unit driving control section 25 to move the focus lens unit 24 in the optical axis direction by the Df amount. After the movement of the focus lens unit 24, the sequence microcomputer 12 obtains a Df amount from the focus detection unit 5 again. The sequence microcomputer 12 repeats this series of operations until the Df amount becomes equal to or smaller than a predetermined amount. When the Df amount becomes equal to or smaller than the predetermined amount, the sequence microcomputer 12 determines that the focus lens unit 24 is located in a focus position, and stops driving the focus lens unit 24.

After the focusing of the focus lens unit 24, when the user presses the release button fully for performing photographing, the sequence microcomputer 12 transmits to the lens microcomputer 20 an f number which is calculated based on an output from a photometric sensor (not shown). The lens microcomputer 20 controls the aperture driving control section 27 to activate the aperture so that an f number thereof becomes the received f number. The sequence microcomputer 12 moves the quick turn mirror 4 so as to be rotated out of the light path for photographing. When the movement of the quick turn mirror 4 is completed, the image sensor driving control section 13 drives the image sensor 11. Here, the image sensor driving control section 13 activates the shutter unit 10 for a time period equivalent to a shutter speed, which is calculated based on the output from the photometric sensor, so as to expose the image sensor 11 to the object light. The image sensor 11 converts the received object light into an electric image signal.

When the exposure is completed, the image sensor driving control section 13 reads the image signal from the image sensor 11, and performs predetermined image processing on the image signal. The image signal, on which the image processing has been performed, is recorded in the image reading/recording section 18 while being displayed as a visible image on the image display section 16. When the exposure is completed, the sequence microcomputer 12 transmits a reset instruction to the quick turn mirror 4, the shutter unit 10, and the lens microcomputer 20 to return each of them to an initial position. The lens microcomputer 20, which has received the reset instruction, controls the aperture driving control section 27 to cause the aperture to be opened and transmits the reset instruction to other units. When the reset is completed, the lens microcomputer 20 transmits a rest completion to the sequence microcomputer 12. After the exposure and a series of processing subsequent to the exposure are completed, the sequence microcomputer 12 recognizes that the release button is not operated, and terminates the photographing sequence.

Figure 5:
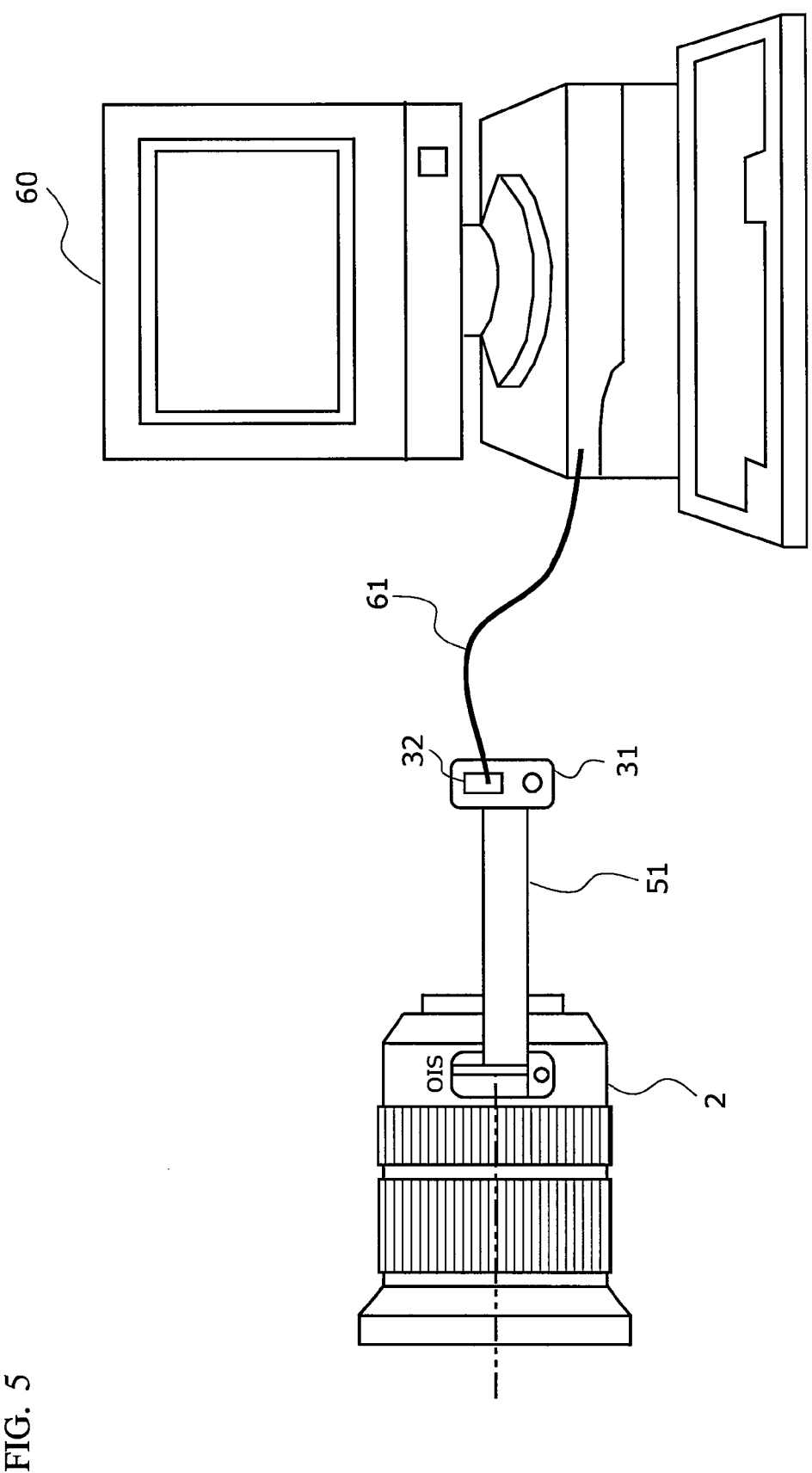
FIG. 5 is a view showing a configuration of a program rewriting system according to the embodiment.

The following will describe processing of replacing the program stored in the flash ROM 36 of the interchangeable lens barrel 2. FIG. 5 shows a configuration of a program rewriting system according to the present embodiment. As shown in FIG. 5, the program rewriting system includes the interchangeable lens barrel 2, and the external data transmitting device 60. A connecting cable 61 is for connecting the interchangeable lens barrel 2 to the external data transmitting device 60, and is, for example, a USB cable. The external data transmitting device 60 is, for example, a personal computer in which the update program is stored in a recording section (not shown). The external data transmitting device 60 transmits the update program to the external data input section 32 of the interchangeable lens barrel 2 through the connecting cable 61. As described above, the program rewriting system of the present embodiment is capable of replacing the program of the interchangeable lens barrel 2 without using the digital camera body 1.

Figure 6:
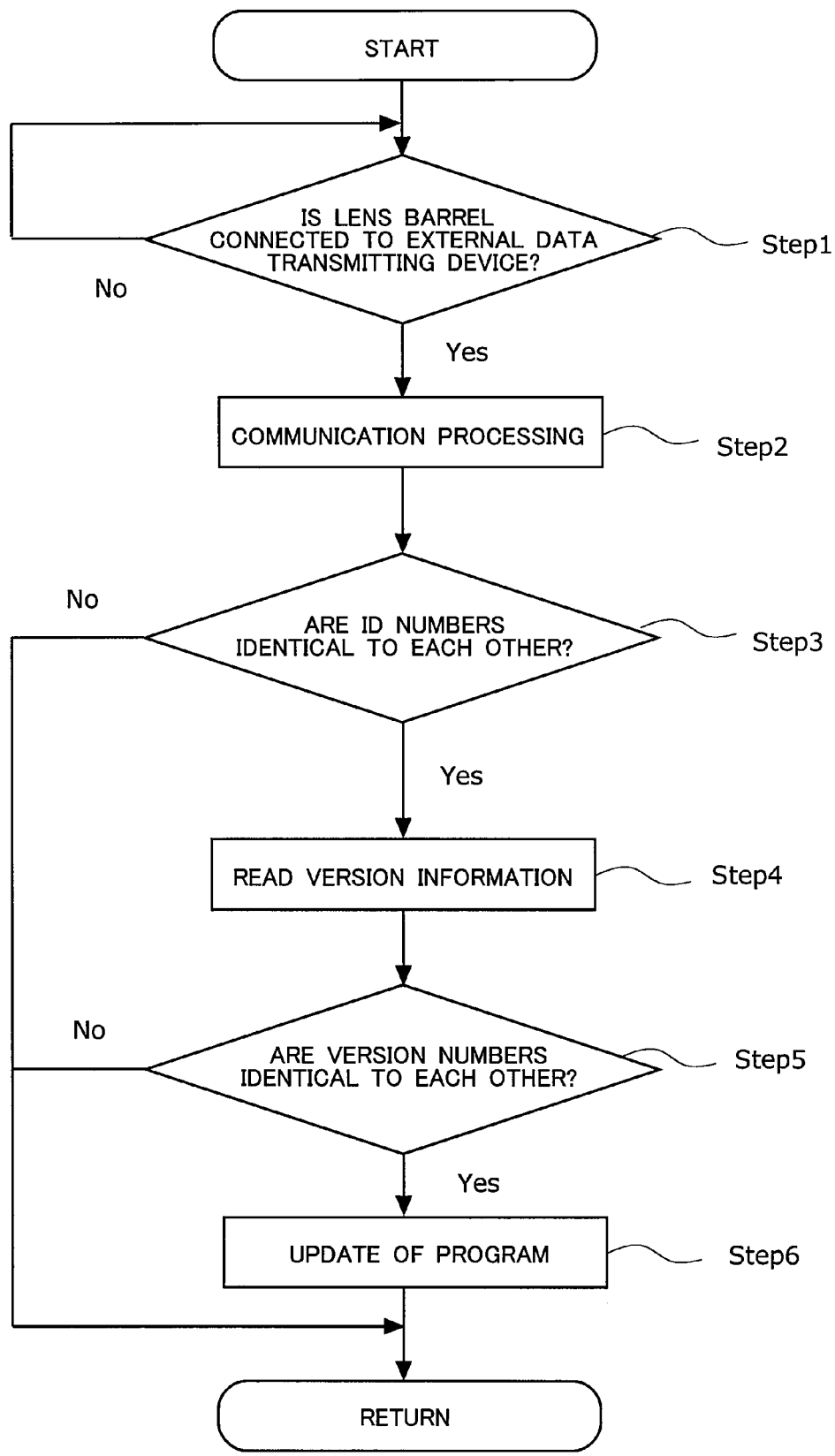
FIG. 6 is a flow chart concerning program rewriting processing according to the embodiment.

FIG. 6 is a flow chart concerning the program rewriting processing. At a Step 1, the lens microcomputer 20 recognizes that the external data input section 32 of the interchangeable lens barrel 2 is connected to the external data transmitting device 60. At this time, the external data transmitting device 60 supplies power to the connected interchangeable lens barrel 2. Thus, the respective components of the lens microcomputer 20, such as the CPU 34, and the like, start to operate, and the processing proceeds to a Step 2.

At the Step 2, communication processing is performed between the lens microcomputer 20 and the external data transmitting device 60. More specifically, the external data transmitting device 60 obtains from the flash ROM 36 of the interchangeable lens barrel 2 an ID number which indicates information on the device type of the interchangeable lens barrel 2. At this time, the external data transmitting device 60 also loads from the recording section (not shown) the update program which is used for replacing. At the subsequent Step S3, whether or not the ID number is identical is determined. More specifically, the external data transmitting device 60 determines whether or not an ID number of the loaded update program is identical to that of the interchangeable lens barrel 2. As a result of the determination, when the ID numbers are not identical to each other, an alarm is displayed on a display section of the external data transmitting device 60, and the processing in FIG. 6 is terminated. On the other hand, when the ID numbers are identical to each other, the processing proceeds to a Step 4.

In the processing at the Step 4, the external data transmitting device 60 obtains a version number of the program stored in the flash ROM 36 of the interchangeable lens barrel 2. At the subsequent Step 5, version number comparison processing is executed. More specifically, the external data transmitting device 60 determines whether or not the version number obtained at the Step 4 is identical to that of the update program which is used for replacing. When the version numbers are identical to each other, since the existing program does not need to be replaced, the external data transmitting device 60 displays the alarm on the display section thereof, and the processing in FIG. 6 is terminated. On the other hand, when the version numbers are not identical to each other, the processing proceeds to a Step 6. It is noted that at the Step 5, the processing in FIG. 6 is also terminated when the version number of the program stored in the interchangeable lens barrel 2 is more recent than that of the program loaded by the external data transmitting device 60, since the program does not need to be replaced. It is noted that the version number comparison processing may be executed by the external data transmitting device 60 or the writing controller 37 of the interchangeable lens barrel 2. In the case where the version number comparison processing is executed in the interchangeable lens barrel 2, a signal concerning a result of the comparison is outputted from the lens microcomputer 20 to the external data transmitting device 60.

At the Step 6, program update processing is executed. The external data transmitting device 60 transmits the update program to the RAM 35 of the interchangeable lens barrel 2, and the update program is temporarily stored in the RAM 35. Under control of the CPU 34, the writing controller 37 replaces the existing program stored in the flash ROM 36 with the update program stored in the RAM 35. Through the processing at the Step 6, the new program is recorded in the flash ROM 36. Then, the program rewriting processing in FIG. 6 is terminated.

As described above, in the interchangeable lens barrel and the program rewriting system according to the present embodiment, since the update program is transmitted from the external data transmitting device to the interchangeable lens barrel for replacing the program in the interchangeable lens barrel therewith, the interchangeable lens barrel does not need to be connected to the camera body, and is provided with improved convenience. Thus, the user can easily update the program in the interchangeable lens barrel, and use the interchangeable lens barrel in combination with various camera bodies. Consequently, the interchangeable lens barrel is prevented from becoming obsolete.

In the present embodiment, the external data input section for receiving the update program is integral with the operation member which is operated by the user. The external data input section does not deteriorate the design of the interchangeable lens barrel and is prevented from being damaged.

Further, particularly, since the program rewriting processing in the present embodiment is capable of being executed by the user of the interchangeable lens barrel, or at a store which sells the interchangeable lens barrel, a service station of a manufacturer, or the like, the interchangeable lens barrel and the rewriting system are provided with improved convenience.

Further, the program rewriting processing in the present embodiment may be executed in a manufacturing process in a plant where interchangeable lenses are manufactured. In such a case, since an interchangeable lens does not need to be mounted to and dismounted from a digital camera body when a new program is to be written, a lens mount which is formed of metal or resin is prevented from being damaged, and a quality of an appearance, and the like are maintained.

Although the processing of replacing the program in the interchangeable lens barrel has been described in the present embodiment, data stored in the flash ROM 36 may be replaced.

Although the personal computer is used as the external data transmitting device 60 in the present embodiment, the external data transmitting device 60 is not limited thereto. As long as a recording medium which stores a program or data, and a device which is capable of transferring the program or the data from the recording medium to the interchangeable lens barrel are provided, their configurations are not limited. For example, the external data transmitting device 60 may be coupled to the digital camera body via a mount or the like, and receive only power supply from the digital camera body at a time of program update. In order to prevent a malfunction at a time of supplying power, the system may be configured such that the digital camera body is set to be in a dedicated mode so as not to perform normal communication of a serial signal.

Concerning replacing of the program, the system may write a most appropriate program for each of camera bodies which are manufactured by different manufacturers. In such a case, the system may store a plurality of programs, and select therefrom a program which suits the camera body. On the other hand, the system may be configured so as to automatically read a type of the camera body to change the program to a program suitable for the camera body.

Although the interchangeable lens barrel and the external data transmitting device are connected to each other by the USB cable in the present embodiment, the present invention is not limited thereto. For example, the interchangeable lens barrel and the external data transmitting device may be connected to each other by a cable for an IEEE1394 serial bus, or wirelessly by a wireless LAN device, or the like. Further, if new communication means is developed by advancement of a communication technique or by another technique derived therefrom, naturally, the interchangeable lens barrel and the external data transmitting device may be connected to each other by using the technique.

Although the external data input section and the circuit substrate which are included in the interchangeable lens barrel are connected to each other by the flexible cable in the present embodiment, the present invention is not limited thereto. For example, the external data input section may be mounted on the circuit substrate.

In the present embodiment, a configuration of the single-lens reflex camera system is not limited to that described above. For example, a digital camera which does not include a quick turn mirror can obtain the effects by the present invention. The interchangeable lens barrel may be of any type as long as the interchangeable lens barrel is detachable from the camera body. For example, the interchangeable lens barrel may be an interchangeable lens barrel which includes an image sensor.

In addition to the operation of replacing the program, the system may have a function of detecting a failed state. For example, an operating state by a secular change of the vibration detection unit may be checked.

Although update of the program in the interchangeable lens barrel has been described in the present embodiment, the present invention is not limited thereto. For example, a program or data for a zoom converter, which is provided between the interchangeable lens barrel and the camera body, a step-up ring, a speed light, or the like may be updated.

Although the interchangeable lens barrel including the imaging optical system has been described in the present embodiment, the present invention is not limited thereto. For example, the present invention may be applied to an interchangeable lens barrel for an optical pickup device which does not include an imaging optical system, and the like.

INDUSTRIAL APPLICABILITY

The interchangeable lens barrel of the present invention and the program rewriting system for the interchangeable lens barrel are suitable for a digital still camera, a digital video camera, or the like which are desired to easily replace the program in the interchangeable lens barrel.

The invention claimed is:

1. An interchangeable lens barrel which is detachable from a camera body, the interchangeable lens barrel comprising:
   a storage section for storing a first program concerning a function of the interchangeable lens barrel;
   a connection section for connecting to an external input/output device;
   a reception section for receiving a second program concerning the function of the interchangeable lens barrel from the input/output device through the connection section in a state where the interchangeable lens barrel is not coupled to the camera body; and
   a rewriting section for replacing the stored first program with the received second program.

2. The interchangeable lens barrel according to claim 1, wherein the storage section is a nonvolatile memory.

3. The interchangeable lens barrel according to claim 1, wherein the rewriting section compares a version of the first program with a version of the second program, and replaces the first program with the second program when the version of the second program is more recent than the version of the first program.

4. The interchangeable lens barrel according to claim 1, further comprising an imaging optical system for forming an optical image of a object, wherein
   each of the first and second programs includes a program for controlling driving of the imaging optical system.

5. The interchangeable lens barrel according to claim 1, further comprising an operation member for being operated by a user, wherein
   the reception section is integral with the operation member.

6. The interchangeable lens barrel according to claim 5, wherein
   the operation member is a photographing mode selection section operated for selecting a photographing mode, and
   a fixed member containing the reception section and the photographing mode selection section is attached on an outer surface of the interchangeable lens barrel.

7. The interchangeable lens barrel according to claim 6, further comprising a vibration compensation section for changing an optical axis of the imaging optical system to compensate blurring of an image, wherein
   the photographing mode includes a blurring compensation mode, in which the vibration compensation section is activated and photographing is performed.

* * * * *